US010469232B2

(12) United States Patent
Singh et al.

(10) Patent No.: US 10,469,232 B2
(45) Date of Patent: Nov. 5, 2019

(54) SYSTEM AND METHOD FOR OPTIMIZED CALCULATION OF PATH MAXIMUM TRANSMISSION UNIT DISCOVERY IN A NETWORK

(71) Applicant: DELL PRODUCTS, LP, Round Rock, TX (US)

(72) Inventors: Ankit Singh, Bangalore (IN); Rohit Kumar Arehalli, Bangalore (IN)

(73) Assignee: Dell Products, LP, Round Rock, TX (US)

( * ) Notice: Subject to any disclaimer, the term of this patent is extended or adjusted under 35 U.S.C. 154(b) by 141 days.

(21) Appl. No.: 15/069,509

(22) Filed: Mar. 14, 2016

(65) Prior Publication Data

US 2017/0264518 A1    Sep. 14, 2017

(51) Int. Cl.
| | | |
|---|---|---|
| *H04L 5/00* | (2006.01) | |
| *H04L 29/06* | (2006.01) | |
| *H04L 12/805* | (2013.01) | |
| *H04L 12/26* | (2006.01) | |
| *H04L 12/741* | (2013.01) | |

(52) U.S. Cl.
CPC ............ *H04L 5/0055* (2013.01); *H04L 43/50* (2013.01); *H04L 47/36* (2013.01); *H04L 69/22* (2013.01); *H04L 45/745* (2013.01)

(58) Field of Classification Search
CPC . H04L 43/0882; H04L 45/745; H04L 5/0055; H04L 69/22
See application file for complete search history.

(56) References Cited

U.S. PATENT DOCUMENTS

| | | | |
|---|---|---|---|
| 7,451,227 B2 | 11/2008 | Lee et al. | |
| 2003/0185208 A1* | 10/2003 | Lee .......................... | H04L 45/12 370/389 |
| 2003/0188015 A1* | 10/2003 | Lee .......................... | H04L 69/16 709/238 |
| 2005/0281288 A1* | 12/2005 | Banerjee .................. | H04L 47/10 370/477 |
| 2012/0051236 A1* | 3/2012 | Hegde ...................... | H04L 43/10 370/252 |
| 2012/0198048 A1* | 8/2012 | Ioffe ....................... | H04L 43/028 709/224 |
| 2015/0341278 A1* | 11/2015 | Sundar ................... | H04L 47/365 370/392 |
| 2017/0093736 A1* | 3/2017 | Tsirkin ..................... | H04L 47/36 |

FOREIGN PATENT DOCUMENTS

CA          2666425 A1    7/2008

* cited by examiner

*Primary Examiner* — Peter P Chau
(74) *Attorney, Agent, or Firm* — Larson Newman, LLP

(57) ABSTRACT

An information handling system includes a memory to store a set of instructions, and a processor. The processor receives a maximum transmission unit (MTU) packet from a second information handling system via a first portion of a communication path, and in response to the information handling system not being a final destination information handling system compares a current MTU size of the communication path with a next MTU size of the communication path. In response to the next MTU size being smaller than the initial MTU size, the processor replaces the current MTU size with the next MTU size as the current MTU size, otherwise maintains the current MTU size as the current MTU size. The processor also provides the MTU packet to a next information handling system via the next portion of the communication path.

14 Claims, 7 Drawing Sheets

SYSTEM AND METHOD FOR OPTIMIZED CALCULATION OF PATH MAXIMUM TRANSMISSION UNIT DISCOVERY IN A NETWORK

FIELD OF THE DISCLOSURE

This disclosure generally relates to information handling systems, and more particularly relates to calculating a path maximum transmission unit discovery in a network.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements can vary between different applications, information handling systems can also vary regarding what information is handled, how the information is handled, how much information is processed, stored, or communicated, and how quickly and efficiently the information can be processed, stored, or communicated. The variations in information handling systems allow for information handling systems to be general or configured for a specific user or specific use such as financial transaction processing, airline reservations, enterprise data storage, or global communications. In addition, information handling systems can include a variety of hardware and software components that can be configured to process, store, and communicate information and can include one or more computer systems, data storage systems, and networking systems.

SUMMARY

An information handling system includes a first node, a second node, and a third node. The first node sends a maximum transmission unit (MTU) packet on a communication path, and an initial MTU size of the communication path is stored a first field of a header of the MTU packet. The second node receives the MTU packet, determines whether a bit is set in a second field of the header of the MTU packet, compares the initial MTU size with a next MTU size of the communication path in response to the bit being set. In response to the next MTU size being smaller than the initial MTU size, the second node replaces the initial MTU size with the next MTU size as a current MTU size within first field of the header of the MTU packet, otherwise the second node maintains the initial MTU size as the current MTU size within first field. The third node receives the MTU packet and generates an acknowledgement (ACK) message. The current MTU size stored in the first field of the header of the MTU packet is stored in a header of the ACK message. The first node receives the ACK message and sets the current MTU size within the field of the header of the ACK message as a path maximum transmission unit discovery value for the communication path from the first node to the third node.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other teachings can certainly be utilized in this application.

Figure 1:
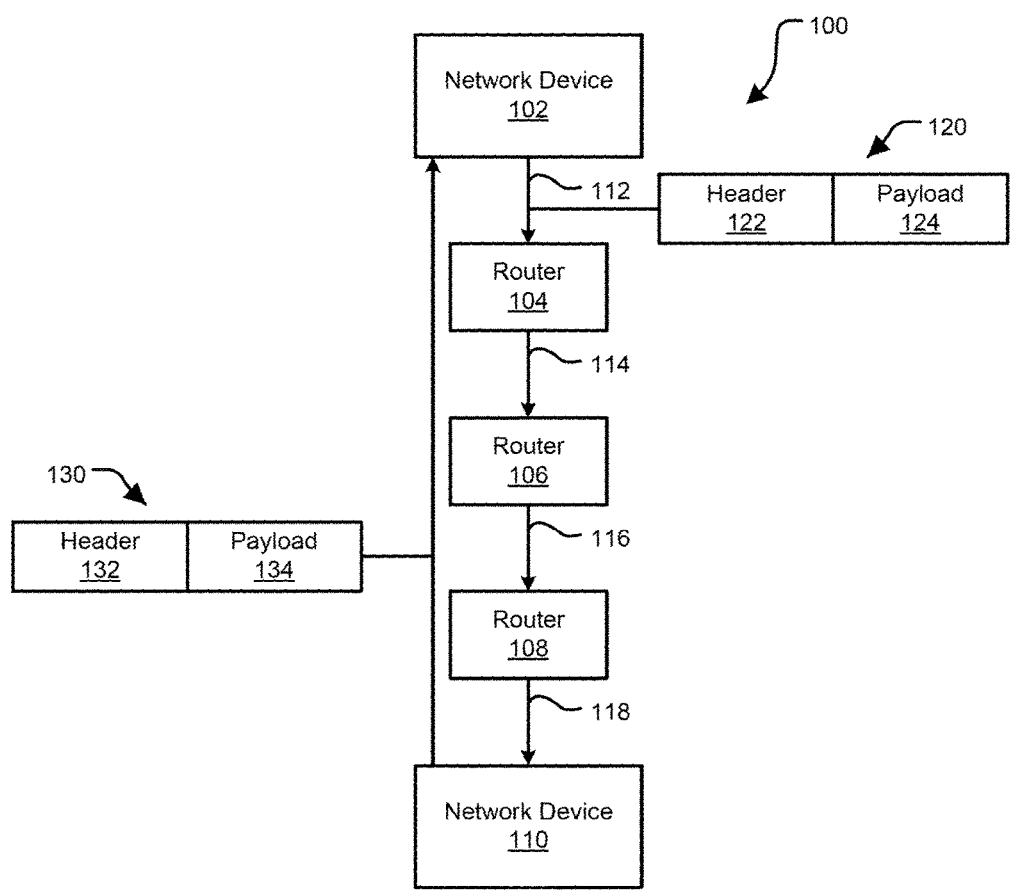
FIG. 1 is a block diagram of a network including multiple network devices to communicate via multiple routers.

FIG. 1 illustrates a network 100 including servers, devices, and/or information handling systems. For purposes of this disclosure, the information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network server or storage device, a switch router or other network communication device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communications between the various hardware components.

The network 100 includes a network device 102, routers 104, 106, and 108, and a network device 110. The network 100 includes a communication path for data packets to be sent from the network device 102 and to the network device 110. In an embodiment, the communication path can be divided into multiple sections or portions in between each component of the network 100. For example, a first portion 112 of the communication path is located between the network device 102 and the router 104, a second portion 114 is located between the router 104 and the router 106, a third portion 116 is located between the router 106 and the router 108, and a fourth portion 118 is located between the router 108 and the network device 110. The network device 110 can provide a packet 120 to the network device 110 via the routers 104-108 and the portion 112-118 of the communication path. The packet 120 can include an Internet Protocol (IP) header 122 and a payload portion 124. Upon the network device 110 receiving the packet 120, the network device 110 can generate an acknowledgment (ACK) message 130 to provide to the network device 102. The ACK message 130 includes an IP header 132 and a payload portion 134.

Prior to the network device 102 providing data packets to the network device 104, a path maximum transmission unit discovery (PMTUD) calculation must be perform to determine the data packet size that can be transmitted along the communication path. The maximum transmission unit (MTU) for a communication path is the largest size packet that can be sent in a packet based network such as the Internet. The PMTUD calculation can be performed by the network device 102 providing a special PMTUD calculation packet or test MTU packet 120 along the communication path to the network device 110. In an embodiment, the payload portion 124 can be empty or can have a minimum amount of data to prevent the test MTU packet 120 from being dropped if one of the portions 112-118 of the communication path has a MTU size that is smaller than the size of the test MTU with a large data payload. The PMTUD calculation with be described with reference to FIGS. 1-6.

Figure 2:
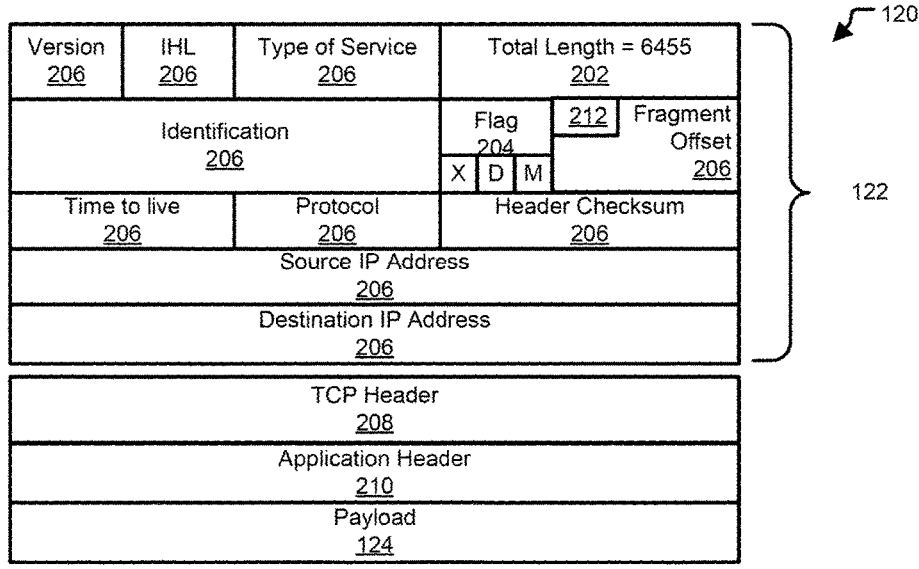
FIGS. 2-5 are diagrams of maximum transmission unit packets sent between the network devices of FIG. 1.

The network device 102 can generate the test MTU packet 120 having a header 122 including the MTU size of the portion 112 of the communication as a total length value 202, a bit X of flag 204 is set, and additional information fields 206 for the MTU packet as shown in FIG. 2. The additional information fields 206 in header 122 can include information that is well known in the art, such as a source IP address for the test MTU packet, a destination IP address, a fragment offset, and the like. The test MTU packet can also include a transmission control protocol (TCP) header 208, an application header 210, and the payload portion 124. The bit X of flag 204 being set indicates to the next component, such as the router 104, that the packet is a test MTU packet and that the packet will include no payload data or a minimum amount of data in the payload portion 124.

The network device 102 can store the MTU size for portion 112 of the communication path in the total length field 202 to indicate an initial MTU size for the communication path. For example, the network device 102 can store the value 6455 in the total length field 202. In an embodiment, the MTU size value can be specify the MTU size in octets or eight-bit bytes. The network device 102 can also set a fragmentation bit 212 within the header 122 to indicate that the MTU packet 120 can be reduced in size, if needed, based on the MTU sizes of the different portions 112-118 of the communication path. Upon the network device 102 setting the bit X of flag 204, storing the MTU size for portion 112 in the total length field 202, and setting the fragmentation bit 212, the network device can provide the test MTU packet to the router 104.

The router 104 can receive the test MTU packet from the network device 102. The router 104 can then check the bit X of the flag field 204 in the test MTU packet 120 to determine whether the test MTU packet is a test packet. If the bit X of the flag field 204 is set, the router 104 can read the MTU size stored in the total length field 202 of the test MTU packet 120. The router 104 can also determine the next MTU size for the next portion 114 of the communication path, such as 3820. The router 104 can then compare the current MTU size stored in the total length field 202 with the next MTU size of portion 114 to determine whether the next MTU size is less than the current MTU size. For example, the current MTU size is 6455 and the next MTU size is 3820, such that the next MTU is less than the current MTU.

Figure 3:
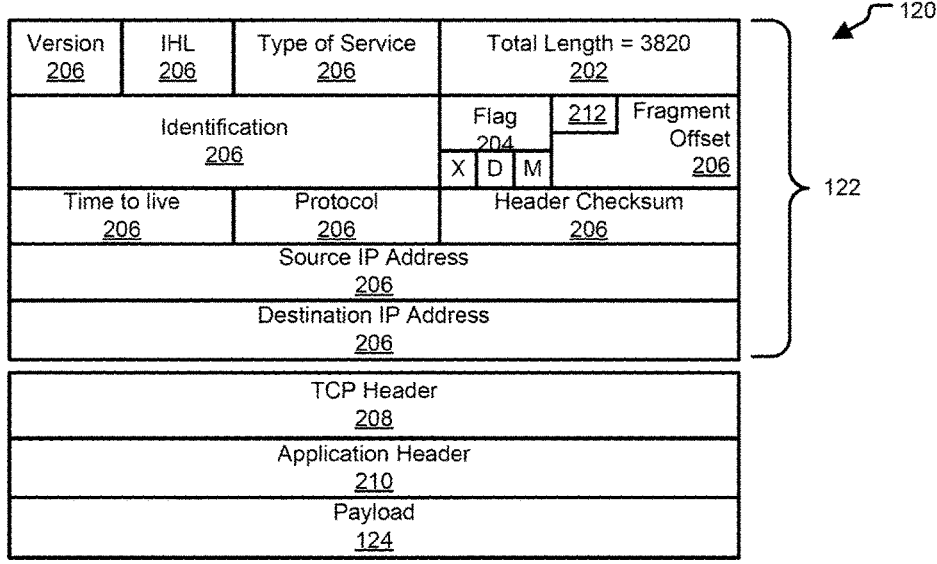

When the next MTU size is less than the current MTU size, the router 104 can replace the MTU size in the total length field 202 of the MTU packet with the next MTU size, such that the next MTU size, 3820, is the current MTU size in the test MTU packet 120 as shown in FIG. 3. However, if the next MTU size is not less than the current MTU size in the total length field 202, the router 104 can maintain the current MTU size value within the total length field.

The router 104 can also verify that the fragmentation bit 212 is set, and in response to the fragmentation bit being set the router can determine whether next MTU size is less than the test MTU packet size. If the next MTU size is less than the test MTU packet size, the router 104 can cut short the payload portion 124 of the test MTU packet to match the next MTU size of portion 114 of the communication path. The router 104 can then provide the test packet 120 to the router 106 via portion 114 of the communication path. Thus, the router 104 can change the current MTU size in the total length field 202 and can cut the size of the MTU packet 120 instead of dropping the MTU packet and sending an Internet Control Message Protocol (ICMP) response message to the network device 102. The ICMP response message, if sent, would indicate that the MTU packet 120 was dropped and that the MTU size of the next portion 114 is less than the size of the MTU packet 120.

The router 106 can receive the test MTU packet from the router 104. The router 106 can then check the bit X of the flag field 204 in the test MTU packet 120 to determine whether the test MTU packet is a test packet. If the bit X of the flag field 204 is set, the router 104 can read the MTU size stored in the total length field 202 of the test MTU packet 120. The router 106 can also determine the next MTU size for the next portion 116 of the communication path, such as 1500. The router 106 can then compare the current MTU size stored in the total length field 202 with the next MTU size of portion 116 to determine whether the next MTU size is less than the current MTU size. For example, the current MTU size, at router 106, is 3820 and the next MTU size is 1500, such that the next MTU is less than the current MTU.

Figure 4:
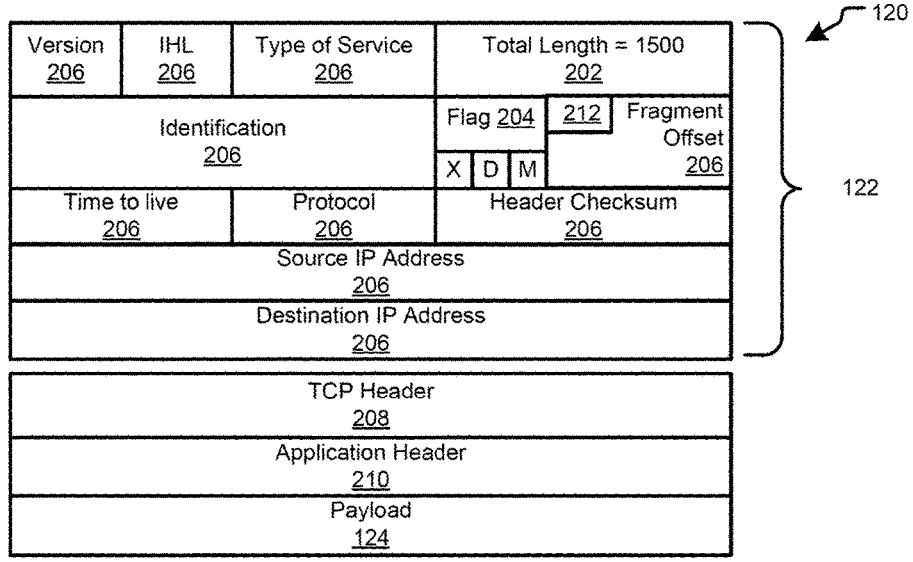

When the next MTU size is less than the current MTU size, the router 106 can replace the MTU size in the total length field 202 of the MTU packet 120 with the next MTU size, such that the next MTU size, 1500, is the current MTU size in the test MTU packet 120 as shown in FIG. 4. However, if the next MTU size is not less than the current MTU size in the total length field 202, the router 106 can maintain the current MTU size value within the total length field.

The router 106 can also verify that the fragmentation bit 212 is set, and in response to the fragmentation bit being set the router can determine whether next MTU size is less than the test MTU packet size. If the next MTU size is less than the test MTU packet size, the router 106 can cut short the payload portion 124 of the test MTU packet to match the next MTU size of portion 116 of the communication path. The router 106 can then provide the test packet 120 to the router 108 via portion 116 of the communication path. Thus, the router 106 can change the current MTU size in the total length field 202 and can cut the size of the MTU packet 120 instead of dropping the MTU packet and sending an ICMP response message to the router 104.

The router 108 can receive the test MTU packet from the router 106. The router 108 can then check the bit X of the flag field 204 in the test MTU packet 120 to determine whether the test MTU packet is a test packet. If the bit X of the flag field 204 is set, the router 108 can read the MTU size stored in the total length field 202 of the test MTU packet 120. The router 108 can also determine the next MTU size for the next portion 118 of the communication path, such as 700. The router 108 can then compare the current MTU size stored in the total length field 202 with the next MTU size of portion 118 to determine whether the next MTU size is less than the current MTU size. For example, the current MTU size, at router 108, is 1500 and the next MTU size is 700, such that the next MTU is less than the current MTU.

Figure 5:
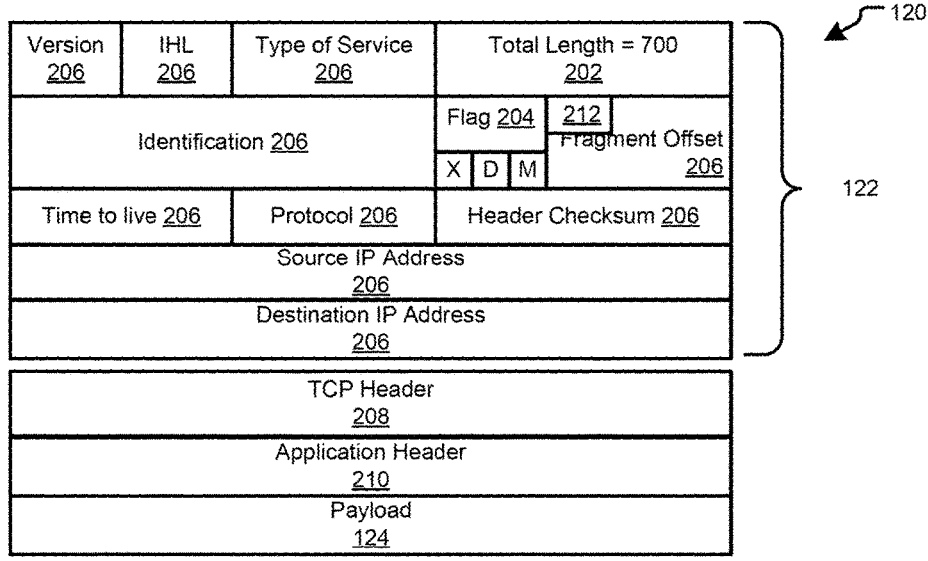

When the next MTU size is less than the current MTU size, the router 108 can replace the MTU size in the total length field 202 of the MTU packet with the next MTU size, such that the next MTU size, 700, is the current MTU size in the test MTU packet 120 as shown in FIG. 5. However, if the next MTU size is not less than the current MTU size in the total length field 202, the router 108 can maintain the current MTU size value within the total length field.

The router 108 can also verify that the fragmentation bit 212 is set, and in response to the fragmentation bit being set the router can determine whether next MTU size is less than the test MTU packet size. If the next MTU size is less than the test MTU packet size, the router 108 can cut short the payload portion 124 of the test MTU packet to match the next MTU size of portion 118 of the communication path. The router 108 can then provide the test packet 120 to the network device 110 via portion 118 of the communication path. Thus, the router 108 can change the current MTU size in the total length field 202 and can cut the size of the MTU packet 120 instead of dropping the MTU packet and sending an ICMP response message to the router 106.

The network device 110 can receive the test MTU packet from the router 108, and can generate an acknowledgement (ACK) message 130 based on the test MTU packet. The ACK message includes a TCP header 602, the IP header 132, an application header 608, and the payload portion 134 as shown in FIG. 4. The TCP header 602 includes a reserved field 604 that can be utilized by the network device 110 to provide a final MTU size for the communication path to the network device 102. The TCP header 602 also includes additional information fields 606. The additional information fields 606 in the TCP header 602 can include information that is well known in the art, such as a source port, a destination port, a sequence number, an acknowledgement number, and the like.

Figure 6:
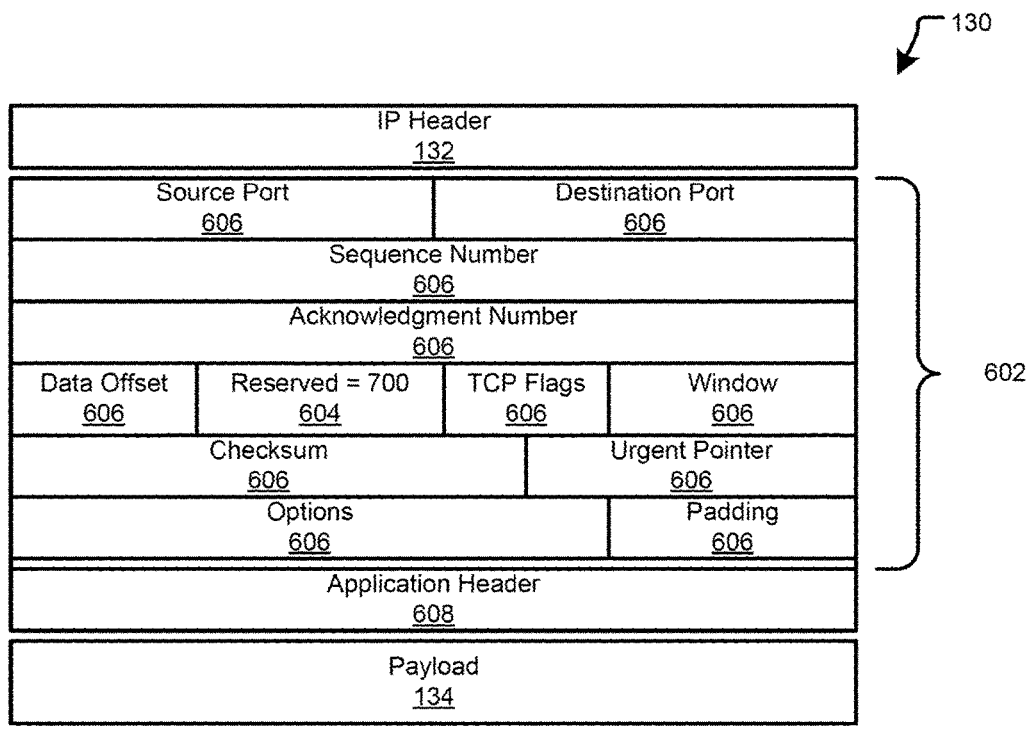
FIG. 6 is a diagram of an acknowledgement packet.

The network device 110 can read the MTU value stored in the total length field 202, such as 700 in FIG. 5, and can set this as a final MTU size for the communication path between the network devices 102 and 110. The network device can then store the final MTU size, 700, within the reserved field 604 of the TCP header 602 of the ACK message 130 as shown in FIG. 6. The network device 110 can then provide the ACK message 130 to the network device 102 as shown in FIG. 1.

The network device 102 can receive the ACK message 130 and read the final MTU size from the reserved field 604 of the ACK message 130. The network device 102 can then set the final MTU size from the ACK message 130 as the PMTUD value for the communication path including the portions 112-118 and the routers 104-108 in between the network devices 102 and 108. The network device 102 can utilize the PMTUD value when sending non-test MTU packets. For example, the network device 102 can verify that the size of a packet to be transmitted to the network device 110 is equal to or less than the PMTUD value for the communication path.

Figure 7:
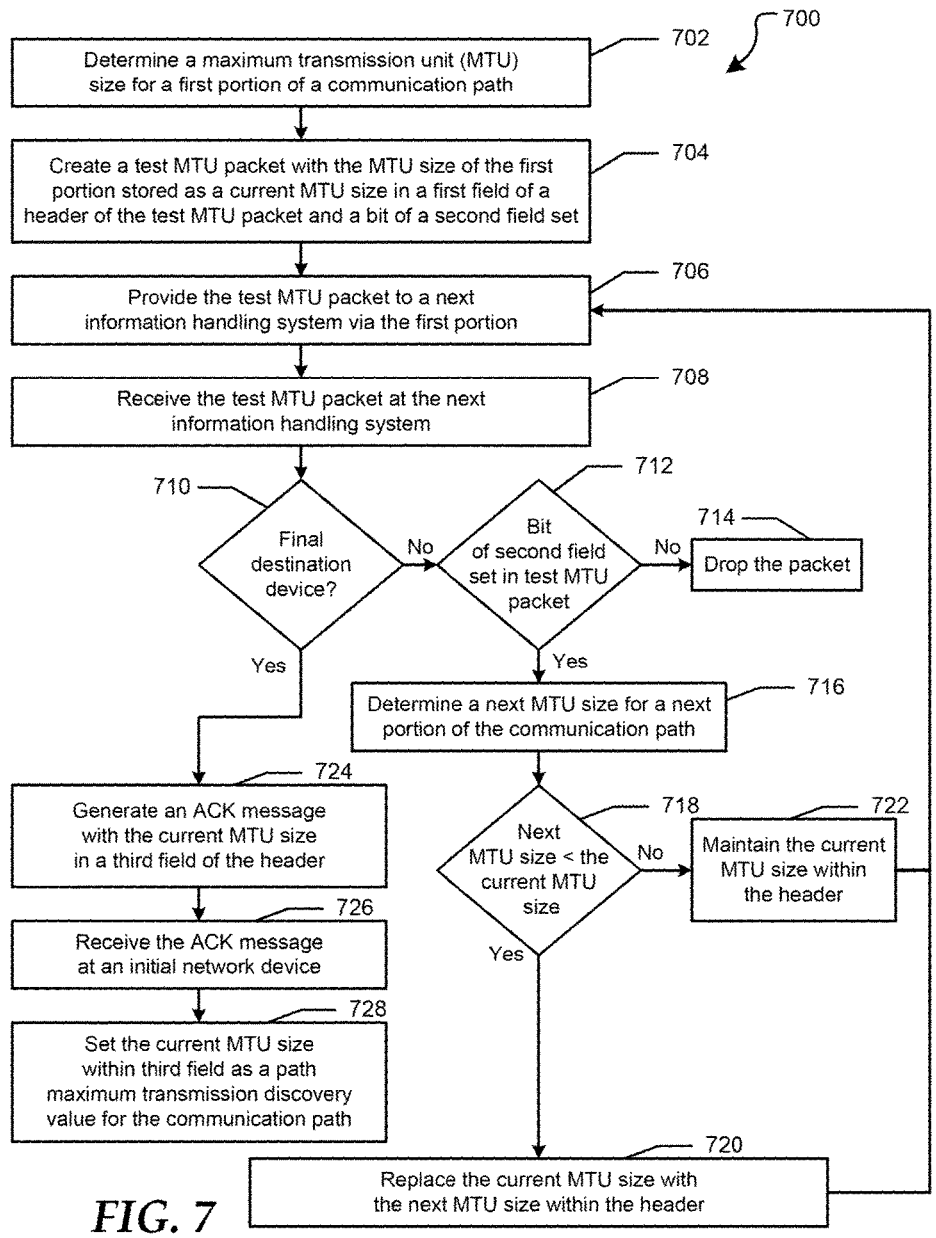
FIG. 7 is a flow diagram of a method for determining a path maximum transmission unit size for the network.

FIG. 7 shows a method 700 for determining a path maximum transmission unit size for the network. At block 702, a maximum transmission unit (MTU) size is determined for a first portion of a communication path. In an embodiment, first portion can be between the network device 102 and the router 104 of FIG. 1. A test MTU packet is created at block 704. In an embodiment, the test MTU packet includes the MTU size of the first portion as a current MTU size stored in a first field of a header of the test MTU packet, and includes a bit in a second field of the header being set. At block 706, the test MTU packet is provided to a next information handling system in a network via the first portion of the communication path. In an embodiment, the next information handling system can be anyone of the routers 104-108 and network device 110 of FIG. 1. The test MTU packet is received at the next information handling system at block 708.

At block 710, a determination is made whether the next information handling system is a final destination device in the communication path. If the next information handling system is the final destination device, the flow continues at block 724, otherwise the flow continues at block 712 and a determination is made whether the bit in the second field of the header of the test MTU packet is set. If the bit in the second field is not set, the packet is dropped, based on the packet not being a test MTU packet at block 714. If the bit is set, the next MTU size for a next portion of the communication path is determined at block 716. At block 718, a determination is made whether the next MTU size is less than the current MTU size. If the next MTU size is less than the current MTU size, then the current MTU size is replaced with the next MTU size within the header at block 720 and the flow continues as stated above at block 706. However, if the next MTU size is not less than the current MTU size, then the current MTU size is maintained within the header at block 722 and the flow continues at block 706.

At block 724, an acknowledgement (ACK) message is generated. In an embodiment, the ACK message includes the current MTU size in a third field of a header of the ACK message. At block 726, the ACK message is received at an initial network device. In an embodiment, the initial network device is the network device 102 of FIG. 1. The current MTU size within the header of the ACK message is set as a path maximum transmission unit discovery value for the communication path at block 728.

Figure 8:
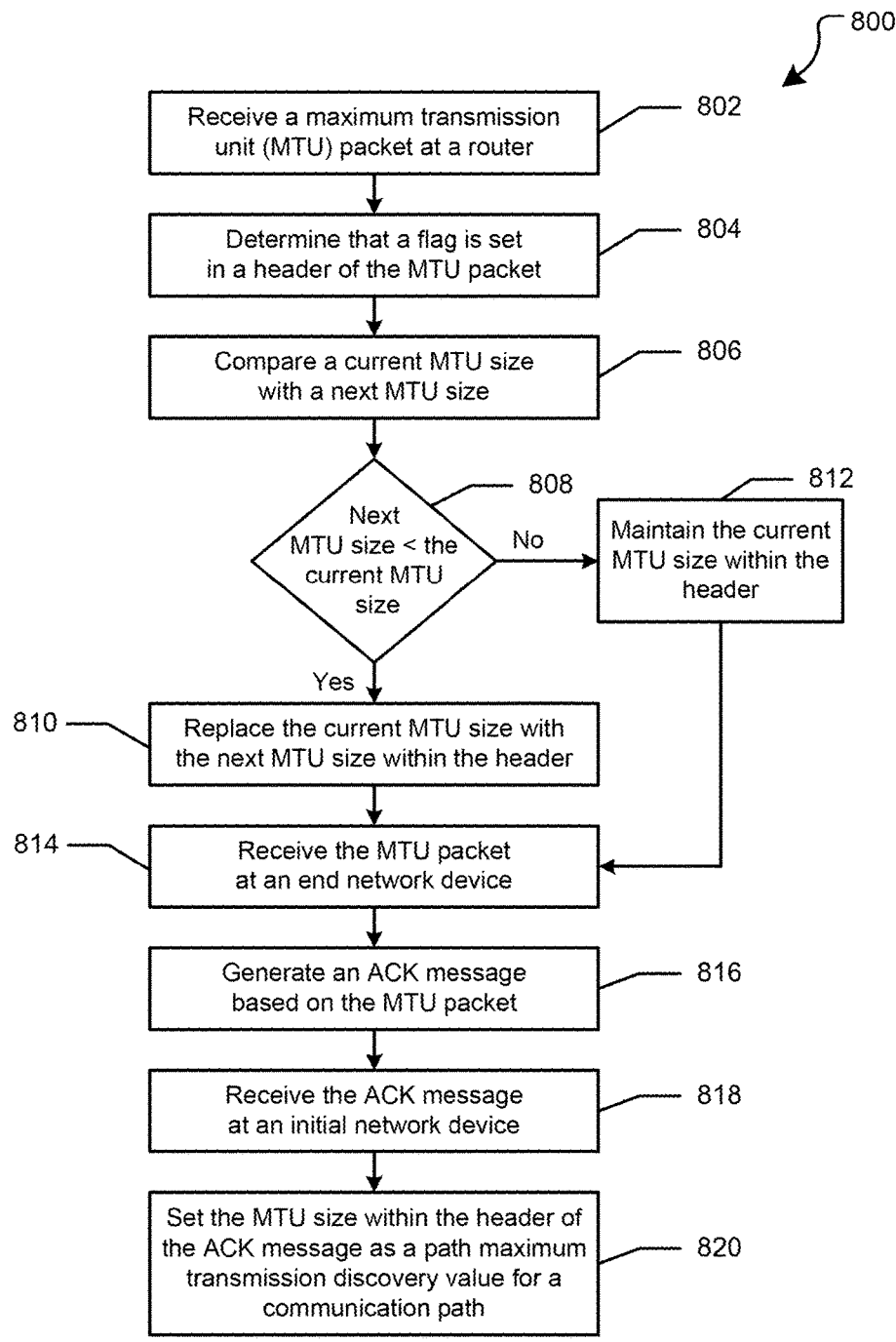
FIG. 8 is a flow diagram of another method for determining a path maximum transmission unit size for the network.

FIG. 8 shows a method 800 for determining a path maximum transmission unit size for the network. At block 802, a maximum transmission unit (MTU) packet is received at a router in a network. In an embodiment, the MTU packet can be received at any of the routers 104, 106, and 108 of FIG. 1, and can be received from the network device 102, or one of the routers 104 and 106 of FIG. 1. In an embodiment, the MTU packet is provided along a transmission path between two network devices to determine the MTU discovery value for the transmission path. A determination is made that a flag is set in a header of the MTU packet at block 804. In an embodiment, the flag being set indicates that the packet is a MTU calculation packet and that the packet will not have a payload, or with have a minimum data payload. At block 806, a current MTU size of the MTU packet is compare with a next MTU size of the transmission path. In an embodiment, the current MTU size is the MTU value for the portion of the transmission path between the network device or router that the MTU packet was received from and router that received the MTU packet, and the next MTU size is the MTU value between the router that received the MTU packet and the next router in the transmission path.

At block 808, a determination is made whether the next MTU size is less than the current MTU size. If the next MTU size is less than the current MTU size, then the current MTU size is replaced with the next MTU size within the header at block 810. However, if the next MTU size is not less than the current MTU size, then the current MTU size is maintained within the header at block 812. At block 814, the MTU packet is received at an end network device. An acknowledgement (ACK) message is generated, at the end network device, based on MTU size within the header of the MTU packet at block 816. At block 818, the ACK message is received at an initial network device. The MTU size within the header of the ACK message is set as a path maximum transmission unit discovery value for the communication path at block 820.

Figure 9:
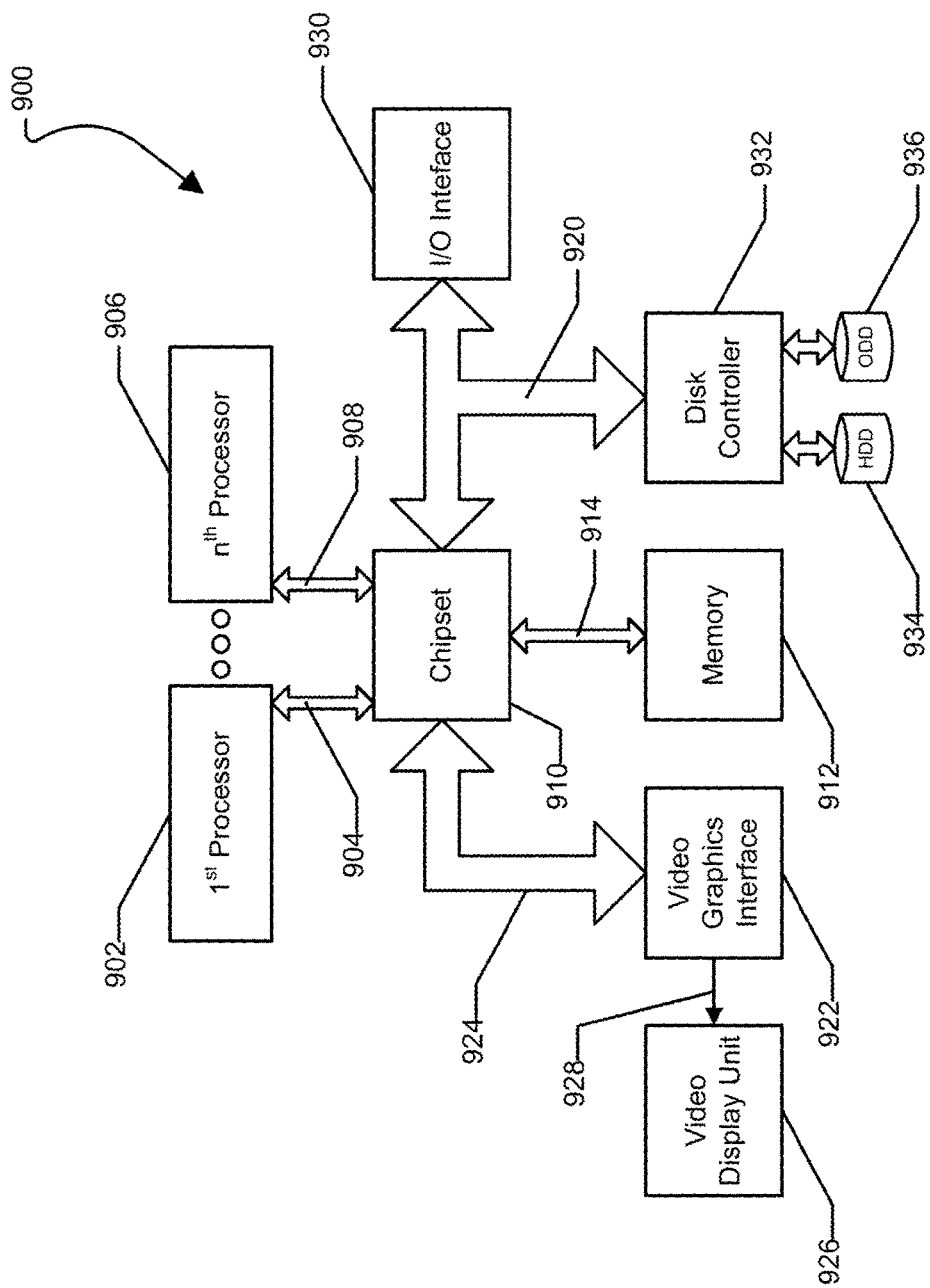
FIG. 9 is a block diagram of a general information handling system.

As shown in FIG. 9, an information handling system 900, such as the network device 102 or 110, can include a first physical processor 902 coupled to a first host bus 904 and can further include additional processors generally designated as $n^{th}$ physical processor 906 coupled to a second host bus 908. The first physical processor 902 can be coupled to a chipset 910 via the first host bus 904. Further, the $n^{th}$ physical processor 906 can be coupled to the chipset 910 via the second host bus 908. The chipset 910 can support multiple processors and can allow for simultaneous processing of multiple processors and support the exchange of information within information handling system 900 during multiple processing operations.

According to one aspect, the chipset 910 can be referred to as a memory hub or a memory controller. For example, the chipset 910 can include an Accelerated Hub Architecture (AHA) that uses a dedicated bus to transfer data between first physical processor 902 and the $n^{th}$ physical processor 906. For example, the chipset 910, including an AHA enabled-chipset, can include a memory controller hub and an input/output (I/O) controller hub. As a memory controller hub, the chipset 910 can function to provide access to first physical processor 902 using first bus 904 and $n^{th}$ physical processor 906 using the second host bus 908. The chipset 910 can also provide a memory interface for accessing memory 912 using a memory bus 914. In a particular embodiment, the buses 904, 908, and 914 can be individual buses or part of the same bus. The chipset 910 can also provide bus control and can handle transfers between the buses 904, 908, and 914.

According to another aspect, the chipset 910 can be generally considered an application specific chipset that provides connectivity to various buses, and integrates other system functions. For example, the chipset 910 can be provided using an Intel® Hub Architecture (IHA) chipset that can also include two parts, a Graphics and AGP Memory Controller Hub (GMCH) and an I/O Controller Hub (ICH). For example, an Intel 820E, an 815E chipset, or any combination thereof, available from the Intel Corporation of Santa Clara, Calif., can provide at least a portion of the chipset 910. The chipset 910 can also be packaged as an application specific integrated circuit (ASIC).

The information handling system 900 can also include a video graphics interface 922 that can be coupled to the chipset 910 using a third host bus 924. In one form, the video graphics interface 922 can be an Accelerated Graphics Port (AGP) interface to display content within a video display unit 926. Other graphics interfaces may also be used. The video graphics interface 922 can provide a video display output 928 to the video display unit 926. The video display unit 926 can include one or more types of video displays such as a flat panel display (FPD) or other type of display device.

The information handling system 900 can also include an I/O interface 930 that can be connected via an I/O bus 920 to the chipset 910. The I/O interface 930 and I/O bus 920 can include industry standard buses or proprietary buses and respective interfaces or controllers. For example, the I/O bus 920 can also include a Peripheral Component Interconnect (PCI) bus or a high speed PCI-Express bus. In one embodiment, a PCI bus can be operated at approximately 33 MHz and a PCI-Express bus can be operated at more than one speed, such as 2.5 GHz, 5 GHz, 8 GHz, and 16 GHz. PCI buses and PCI-Express buses can be provided to comply with industry standards for connecting and communicating between various PCI-enabled hardware devices. Other buses can also be provided in association with, or independent of, the I/O bus 920 including, but not limited to, industry standard buses or proprietary buses, such as Industry Standard Architecture (ISA), Small Computer Serial Interface (SCSI), Inter-Integrated Circuit ($I^2C$), System Packet Interface (SPI), or Universal Serial buses (USBs).

In an alternate embodiment, the chipset 910 can be a chipset employing a Northbridge/Southbridge chipset configuration (not illustrated). For example, a Northbridge portion of the chipset 910 can communicate with the first physical processor 902 and can control interaction with the memory 912, the I/O bus 920 that can be operable as a PCI bus, and activities for the video graphics interface 922. The Northbridge portion can also communicate with the first physical processor 902 using first bus 904 and the second bus 908 coupled to the $n^{th}$ physical processor 906. The chipset 910 can also include a Southbridge portion (not illustrated) of the chipset 910 and can handle I/O functions of the chipset 910. The Southbridge portion can manage the basic forms of I/O such as Universal Serial Bus (USB), serial I/O, audio outputs, Integrated Drive Electronics (IDE), and ISA I/O for the information handling system 900.

The information handling system 900 can further include a disk controller 932 coupled to the I/O bus 920, and connecting one or more internal disk drives such as a hard disk drive (HDD) 934 and an optical disk drive (ODD) 936 such as a Read/Write Compact Disk (R/W CD), a Read/Write Digital Video Disk (R/W DVD), a Read/Write mini-Digital Video Disk (R/W mini-DVD), or other type of optical disk drive.

Although only a few exemplary embodiments have been described in detail in the exemplary embodiments without materially departing from the novel teachings and advantages of the embodiments of the present disclosure. For example, the methods described in the present disclosure can be stored as instructions in a computer readable medium to cause a processor, such as chipset 910, to perform the method. Additionally, the methods described in the present disclosure can be stored as instructions in a non-transitory computer readable medium, such as a hard disk drive, a solid state drive, a flash memory, and the like. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. An information handling system comprising:
   a first node to send a maximum transmission unit (MTU) packet on a communication path, wherein an initial maximum transmission unit (MTU) size of the communication path is stored in a first field of a header of the MTU packet;
   a second node in communication with the first node, the second node to receive the MTU packet, the second node to determine whether or not a bit is set in a second field of the header of the MTU packet, wherein the MTU packet is a test MTU packet when the bit is set in the second field of the header, the second node to drop the MTU packet in response to the MTU packet not being the test MTU packet, the second node to compare the initial MTU size with a next MTU size of the communication path in response to the bit being set and the MTU packet being the test packet, and in response to the next MTU size being smaller than the initial MTU size, the second node to replace the initial MTU size with the next MTU size as a current MTU size within the first field of the header of the MTU packet to create a modified MTU packet, otherwise the second node to maintain the initial MTU size as the current MTU size; and
   a third node in communication with the second node and with the first node, the third node to receive the modified MTU packet, the third node to generate an acknowledgement (ACK) message, wherein the current MTU size in the modified MTU packet is stored in a field of a header of the ACK message, and the third node to provide the ACK message to the first node, the first node to receive the ACK message, and the third node to set the current MTU size within the field of the header of the ACK message as a path maximum transmission unit discovery value for an initial communication path from the first node to the third node.

2. The information handling system of claim 1 wherein the initial MTU size is a MTU size between the first node and the second node.

3. The information handling system of claim 1 wherein the next MTU size is a MTU size between the second node and the third node.

4. The information handling system of claim 1 wherein the second node further to determine whether or not a fragmentation bit is set in the header of the MTU packet, and in response to the fragmentation bit being set and the next MTU size being smaller than the initial MTU size, the second node to cut the MTU packet based on the next MTU size.

5. The information handling system of claim 1 wherein the current MTU size is stored in a reserve field of the header of the ACK message.

6. The information handling system of claim 1 wherein the MTU packet includes a minimum data payload.

7. The information handling system of claim 6 wherein the minimum payload prevents the MTU packet from being dropped due to payload missing after the MTU packet is cut based on a MTU calculation for a next portion of the communication path from the first node to the third node.

8. A method comprising:
   receiving, from a first node of a network, a maximum transmission unit (MTU) packet at a second node of the network, wherein an initial maximum transmission unit (MTU) size of a communication path is stored in a first field of a header of the MTU packet;
   determining, by the second node, whether or not a bit is set in a second field of the header of the MTU packet, wherein the MTU packet is a test MTU packet when the bit is set in the second field of the header;
   dropping, by the second node, the MTU packet in response to the MTU packet not being the test MTU packet;
   comparing, by the second node, the initial MTU size with a next MTU size of the communication path in response to the bit being set and the MTU packet being the test packet;
   in response to the next MTU size being smaller than the initial MTU size, replacing the initial MTU size with the next MTU size as a current MTU size within the second field of the header of the MTU packet to create a modified MTU packet, otherwise maintaining the initial MTU size as the current MTU size within the second field;
   receiving, at a third node of the network, the modified MTU packet;
   generating, by the third node, an acknowledgement (ACK) message, wherein the current MTU size in the second field of the header of the modified MTU packet is stored in a field of a header of the ACK message;
   receiving, at the first node, the ACK message; and
   setting, by the first node, the current MTU size within the field of the header of the ACK message as a path maximum transmission unit discovery value for an initial communication path from the first node to the third node.

9. The method of claim 8 wherein the initial MTU size is a MTU size between the first node and the second node.

10. The method of claim 8 wherein the next MTU size is a MTU size between the second node and the third node.

11. The method of claim 8 wherein the current MTU size is stored in a reserve field of a transmission control protocol header of the ACK message.

12. The method of claim 8 wherein the MTU packet includes a minimum data payload.

13. The method of claim 12 wherein the minimum payload prevents the MTU packet from being dropped due to payload missing after the MTU packet is cut based on a MTU calculation for a portion of the communication path from the first node to the third node.

14. The method of claim 8 further comprising:
   determining, by the second node, whether or not a fragmentation bit is set in the header of the MTU packet; and
   in response to the fragmentation bit being set and the next MTU size being smaller than the initial MTU size, cutting, by the second node, the MTU packet based on the next MTU size.

* * * * *